Figure 3:
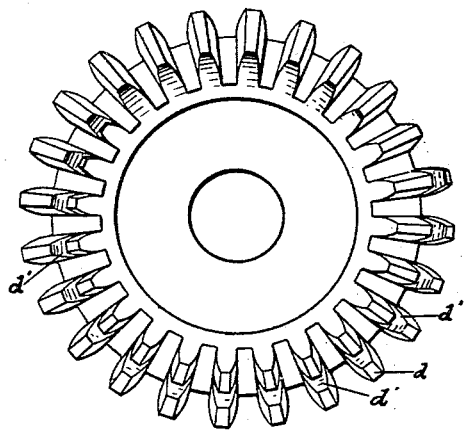

No. 616,649. Patented Dec. 27, 1898.
O. J. BEALE.
DEVICE FOR GENERATING GEAR TEETH.
(Application filed Feb. 25, 1898.)

(No Model.)

WITNESSES
R. A. Bates
Iva L. Fish

INVENTOR
Oscar J. Beale,
By Wilmarth H. Thurston,
Attorney.

UNITED STATES PATENT OFFICE.

OSCAR J. BEALE, OF PROVIDENCE, RHODE ISLAND, ASSIGNOR TO THE BROWN & SHARPE MANUFACTURING COMPANY, OF SAME PLACE.

DEVICE FOR GENERATING GEAR-TEETH.

SPECIFICATION forming part of Letters Patent No. 616,649, dated December 27, 1898.

Application filed February 25, 1898. Serial No. 671,569. (No model.)

*To all whom it may concern:*

Be it known that I, OSCAR J. BEALE, of the city and county of Providence, in the State of Rhode Island, have invented a certain new and useful Device for Generating Gear-Teeth; and I do hereby declare the following specification, taken in connection with the accompanying drawings, forming a part of the same, to be a full, clear, and exact description thereof.

The present invention is based upon the principle that if two pitch-surfaces are rolled together without slip a tooth upon one surface will develop or generate a tooth upon the other pitch-surface which is conjugate to the generating-tooth; and it consists in a generator in the form of a gear having the teeth mutilated or portions thereof removed to form edges or points arranged in varying relation to the pitch-surface, so that they will remove the surplus stock from the surfaces of the blank-teeth by merely rolling the pitch-surfaces together. As the pitch-surfaces roll together each edge or point on the generator removes a portion of the surplus stock on the blank and forms a conjugate line or point on the surface of a tooth of the blank, and as successive edges or points act upon the tooth-surfaces more and more of the surplus stock is removed, until the entire surface of the tooth is generated or developed. The arrangement of the edges or points may be varied as desired, depending upon the portions of the teeth which are removed. Thus the teeth may be mutilated by cutting away the tops of the teeth, so that they are of varying heights, and the edges formed may be either parallel or inclined to the pitch-surface or their inclination to the pitch-surface may vary upon successive teeth. Again, the teeth may be mutilated by cutting a spiral V-shaped groove in the face of the gear and forming edges which extend from the top to the bottom of the teeth and are inclined to the pitch-surface, or the teeth may be mutilated in various ways without departing from the invention. The edges may be subdivided until they become in effect a series of points, as shown in Fig. 5; but it is preferred to provide each tooth with one or more continuous edges. With this character of generator every tooth upon the generator should engage every tooth upon the blank, in order that all the edges or points of the generator may act upon every tooth of the blank, and the number of teeth in the generator and blank should be proportioned to accomplish this result.

The invention may be applied to the manufacture of any form of gearing, but is especially useful in the manufacture of bevel-gearing, in which the curvature of the tooth-surfaces change from one end of a tooth to the other and which cannot therefore be accurately cut in the usual way, but require filing and fitting before they will run properly.

In the application of the invention to the manufacture of bevel-gearing the pitch-cone of the generator may be varied and the form of teeth upon the generator may be varied; but it is preferred to use a generator in the form of a crown-gear the tooth-surfaces of which are plane surfaces, as such a gear may be conveniently and accurately cut, and the gears formed by such a generator will run accurately with each other and form an interchangeable set.

Figure 1:
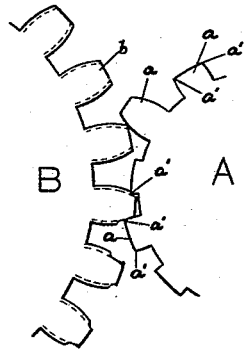
Figure 1:
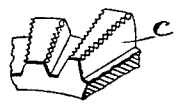
Figure 4:
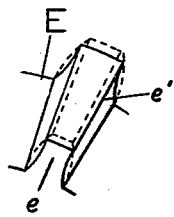
Figure 2:
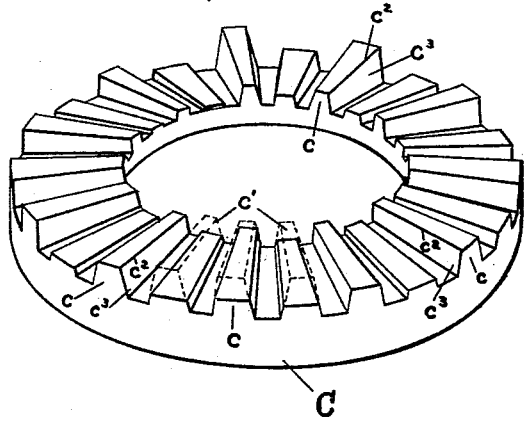

Referring to the drawings, Figure 1 is a diagrammatic view indicating one form of generator and its action upon the blank. Fig. 2 is a perspective view of a preferred form of generator. Fig. 3 is a front elevation of a modified form of generator. Fig. 4 is a view of a fragment of a modification. Fig. 5 is a view showing the teeth provided with points.

Referring to Fig. 1, A represents a portion of a generator in the form of a spur-gear, having portions of its teeth $a$ removed to form edges $a'$. The different teeth are so cut away that the edges $a'$ upon different teeth are at varying distances from the pitch-surface.

B represents a blank having teeth $b$ which have been roughed out to approximately the correct form. As the generator and blank are rolled together the edges of the generator cut away the stock on the gear-blank, and when the pitch-surfaces are brought into contact and rolled together every edge upon the generator generates a line upon a tooth-surface of the blank. The number of teeth in the generator should be so related to the number of teeth in the blank that a tooth of the generator will engage a different tooth upon the blank at each revolution, so that when the blank has made as many revolutions as there are teeth in the generator every tooth of the generator will have engaged every tooth of the blank and a number of lines will be generated upon each tooth-surface of the blank corresponding to the number of teeth in the generator. Theoretically each tooth-surface of the blank will be formed of lines which are, in the correct surface, separated by slight ridges; but in practice these ridges are so slight that they are not appreciable. Moreover, the surfaces of the portions of the teeth not cut away act against the surfaces of the blank-teeth and mold or press the slight ridges down to the correct shape, thus finishing and burnishing the blank-teeth.

In Fig. 2 the generator C is shown in the form of a crown-gear having teeth $c$ which are truncated wedges in cross-section. The teeth are mutilated by removing the tops, as indicated in dotted lines at $c'$, to form edges $c^2$, which are in varying relation to the pitch-surface. In removing varying portions of the teeth it is preferred to locate a tooth which is nearly cut away adjacent a tooth which is but slightly cut away, so that there may be at least one high tooth in mesh with the blank at all times. The action of this generator on a bevel-gear blank is the same as above described, the edges $c^2$ acting to cut away the stock on the blank-teeth and the surfaces $c^3$ acting to burnish and finish the surface of the teeth.

In Fig. 3 is shown a modified form of generator. In this form of generator the edges $a'$ are formed on the teeth $d$ by cutting a V-shaped spiral groove $d'$ in the face of the gear. The action of this generator is the same as above described.

In Fig. 4 is shown a fragment of another form of generator embodying the invention. In this form of generator the teeth $e$ of the generator E not only have the tops cut away, as indicated in dotted lines, but also have the surfaces of the teeth cut away below the edges $e'$. With this form of generator the surplus stock on the teeth of the blank will be cut away by the edges of the generator, as before; but there will be no burnishing or pressing action and the generator will not act to drive the blank or be driven thereby.

What I claim as my invention, and desire to secure by Letters Patent, is—

1. A device for generating gear-teeth in the form of a gear having teeth mutilated in a varying manner, substantially as described.

2. A device for generating gear-teeth in the form of a bevel-gear having teeth mutilated in a varying manner, substantially as described.

3. A device for generating gear-teeth in the form of a crown-gear having teeth mutilated in a varying manner, substantially as described.

4. A device for generating gear-teeth in the form of a gear having a series of edges each located in a different tooth-surface, and arranged in varying relation to the pitch-surface, substantially as described.

5. A device for generating gear-teeth in the form of a gear having mutilated teeth of varying heights, substantially as described.

6. A device for generating gear-teeth in the form of a bevel-gear having mutilated teeth of varying heights, substantially as described.

7. A device for generating gear-teeth in the form of a crown-gear having mutilated teeth of varying heights, substantially as described.

8. A device for generating gear-teeth in the form of a gear having mutilated teeth of varying height and having the short teeth located adjacent the high teeth, substantially as described.

OSCAR J. BEALE.

Witnesses:
R. A. BATES,
W. H. THURSTON.